Sept. 17, 1929. K. O. KELLER 1,728,765
PACKING DEVICE FOR USE IN FLUID PRESSURE ENGINES
Filed Feb. 1, 1926 2 Sheets-Sheet 1
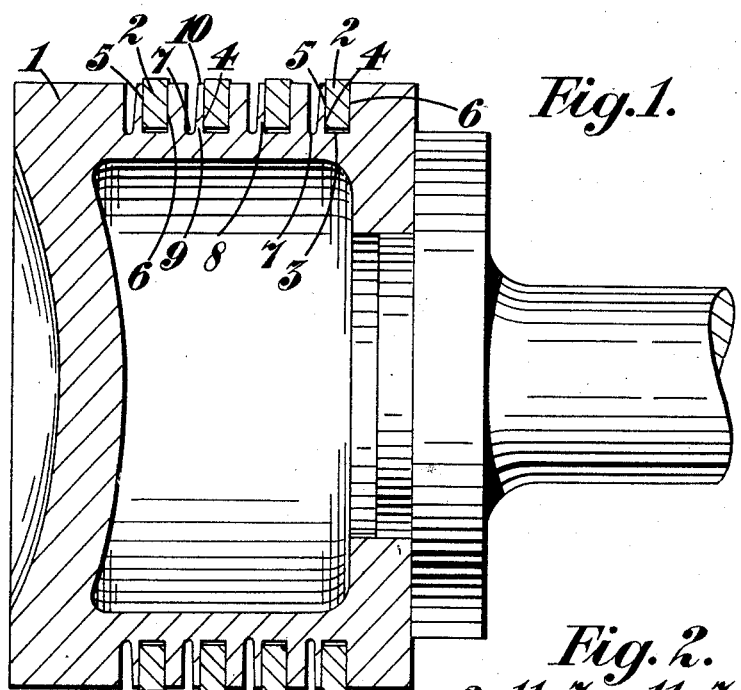
Fig.1.
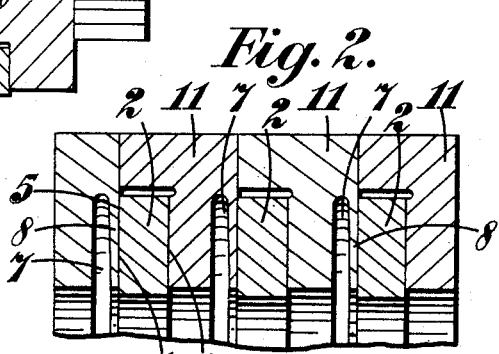
Fig.2.
Fig.3.
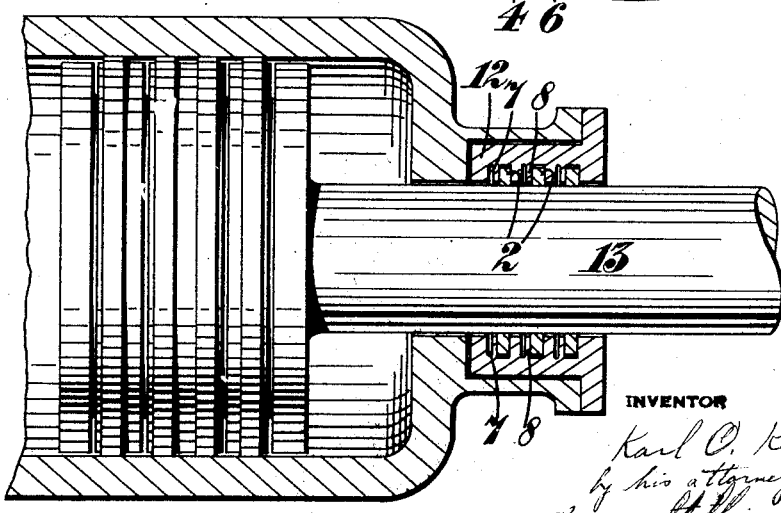
INVENTOR
Karl O. Keller
by his attorneys
Byrnes Stebbins Parmelee Sept. 17, 1929.  K. O. KELLER  1,728,765

PACKING DEVICE FOR USE IN FLUID PRESSURE ENGINES

Filed Feb. 1, 1926  2 Sheets-Sheet 2

INVENTOR
Karl O. Keller
by his attorneys
Byrnes, Stebbins & Parmelee

Patented Sept. 17, 1929

1,728,765

UNITED STATES PATENT OFFICE

KARL OTTO KELLER, OF SUNDERLAND, ENGLAND, ASSIGNOR, BY DIRECT AND MESNE ASSIGNMENTS, TO WILLIAM DOXFORD & SONS, LIMITED, OF SUNDERLAND, ENGLAND

PACKING DEVICE FOR USE IN FLUID-PRESSURE ENGINES

Application filed February 1, 1926, Serial No. 85,237, and in Great Britain October 12, 1925.

This invention relates to a packing device for use in fluid-pressure engines, for the purpose for example, of packing pistons, piston-rods and glands or any other machine-element between which and another there is relative motion and which it is desired to keep fluid-tight.

There are few details in machine-design which have received more attention than piston-rings; nevertheless a satisfactory packing device e. g. a piston, has not heretofore been produced; the troubles due to the piston-rings in the cylinders of large internal-combustion engines—and the cylinder-dimensions of such engines steadily tend to increase—are a matter of common knowledge among engineers. These troubles arise from:—

(1) Excessive wear of the cylinder-liner by the rings;

(2) Wear of each piston-ring, upon that one of its faces which contacts with the liner, and also upon its other or side faces;

(3) Wear of those side-faces of the grooves in the piston which correspond with the respective side-faces of the ring;

(4) Leakage of working-fluid past the rings, not only between the liner and the adjacent or contiguous face of the ring but also past the rings by way of their side-faces aforesaid and of the bottom of the groove.

(5) Destruction of the film of lubricating-oil on the rubbing surfaces along which the aforesaid leakages occur.

There is a cut across the piston-ring to allow for springing it into its place and for such increase of its circumference as is due to temperature-rise and as is necessary to compensate for radial wear of ring and liner. A small leakage of working-fluid finds its way through this cut to the back of the ring, if the cut is left open. But there are well-known means for blocking it.

The presence of working-fluid under pressure behind the ring expands the ring radially towards the cylinder-liner. But leakage through the cut across the piston-ring can either be stopped or alternatively (with the very narrow cut which is used in some cases) is so small in quantity and so "wire-drawn" as to its pressure that if leakages entering the space behind a ring through other channels than the cut were to be stopped, the residual leakage, that is to say such leakage, if any, as occurred by way of the cut, could be safely ignored, and all the troubles set out in the numbered statements above would be minimized.

It is the experience of the present applicant that the cause of these troubles is the fact that the circumferential clearance produced by making the groove in the piston or other machine-element appreciably wider than the width of the packing-piece or piston-ring or segment received in it, has been left open. This open clearance or excess width, in the case of a piston-ring twenty inches in external diameter, is usually about four one-thousandths of an inch in width and such clearance gradually increases in service and opens wider by reason of the wear upon the sides of the grooves with the result that there is a gradual increase of leakage past the ring.

It is the object of the present invention to close the clearance left between each of the two sides of the ring or equivalent packing-piece and the walls of the groove towards which those sides are presented.

According to the present invention there is combined with a machine-element and a packing-piece fitting into and projecting from a groove therein, a sealing-tongue secured fluid-tight by its root to the machine-element along that side of the packing-piece towards which the working-fluid first approaches. This tongue has a portion which is elastic and flexible, which is extended from the root along and in contact with the said side of the packing-piece and which is employed to constitute a fluid-tight seal along the adjacent side of the packing-piece and to keep the packing-piece pressed at the same time against the farther side of the groove and thereby effect also a corresponding sealing action there. The sealing occurring by reason of the presence of the sealing-tongue will be effected by any fluid-pressure acting against the exterior of the tongue. The tongue though elastic and yielding is stiff enough to intercept a portion of the pressure that is on its way to the ring so that the lateral shock imparted by the pressure to the ring is less than it would be were the tongue absent. Moreover, the tongue being home upon the ring and keeping the ring home against the side of the groove that is remote from the tongue, slamming of the ring across the groove and the wear and damage of parts to which it would give rise is prevented.

In the accompanying drawings, which illustrate various applications of the packing device of the present invention—

Figure 1 is a longitudinal axial section through the piston of an internal-combustion engine fitted with the packing device;

Figure 2 is a section through a series of rings of circular packing, one side only of the rings being shown;

Figure 3 is a longitudinal central section through a cylinder provided with a gland in which latter are piston-rod packing devices.

Like reference numerals indicate like parts throughout the drawings.

Figure 4:
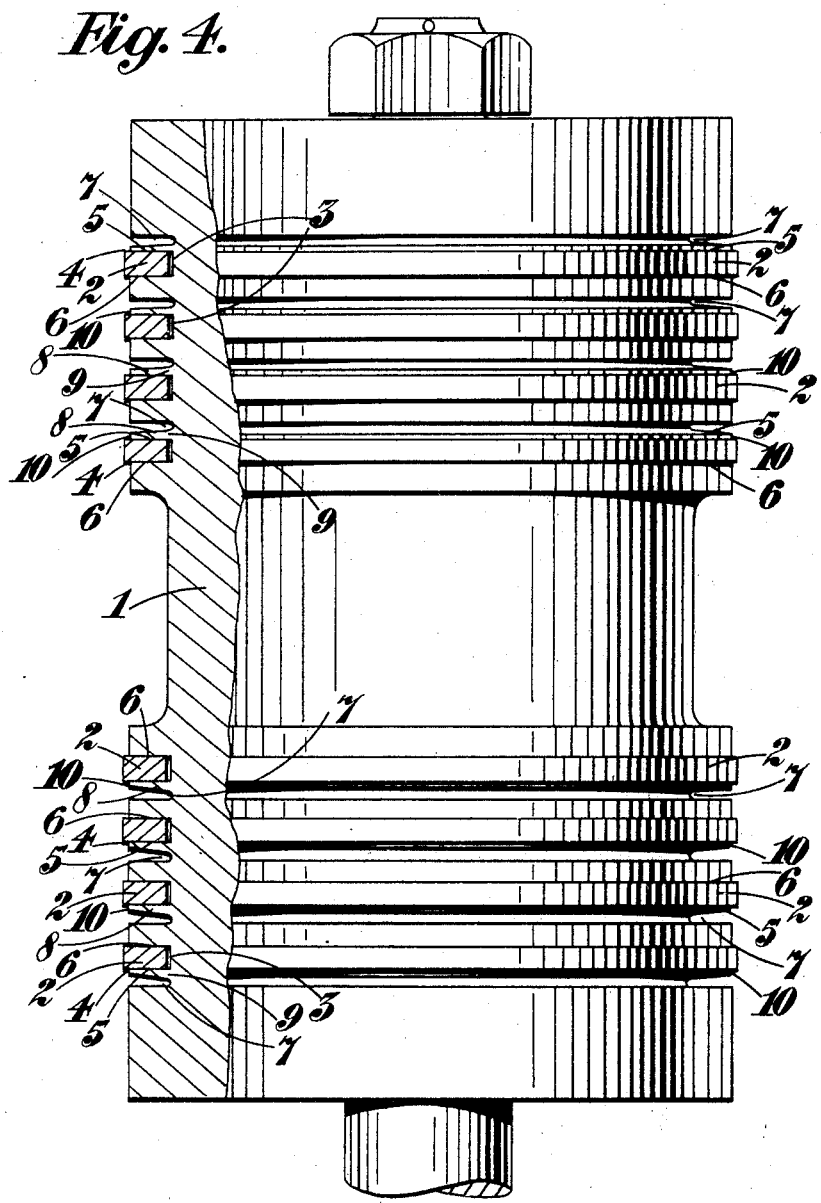
Figure 4 is a section through the packed piston of a double-acting steam engine.

With reference first to Figure 1, the machine-element,—that is to say, the piston body 1—which is that of a single-acting engine and may be as large as 20 to 30 inches in diameter, is packed by packing-pieces, each of which is a ring 2, projecting from a corresponding groove 3 in the piston-body. Across this groove the packing-piece 2 tends under the influence of the working-fluid approaching one of its side-faces 4 to be forced away from the side 5 of the groove towards the other side 6. Narrow annular channels 7 are turned in the piston-body to approximately the same depth as that of the grooves 3 so that a sealing-tongue 8 results, which is fluid-tight with the piston-body by its root 9 alongside the side-face 4 of the ring and has a portion 10 which though possessing some stiffness is elastic and flexible, and which is a working fit along its outer margin upon the side-face 4 of the ring 2, and will be pressed closely into contact with it by the action of the fluid pressure in each channel 7 against the exterior of the sealing-tongue 8. By the pressure of the sealing-tongue 8 against the side 4 of the ring, not only is the leakage of gas down that side of the ring prevented, but in addition, the ring 2 is pressed close against the side 6 of the groove and consequently the leakage of gas down that side also is prevented.

In Figure 2, the construction differs from that which is illustrated in Figure 1 only in this, that the packing is built up of associated annuli 11 having one annular tongue 8 and channel 7 on each annulus.

In Figure 3, the packing-pieces are rings 2 which, instead of lying upon the exterior of a machine-element, are situated in the interior of a cylindrical gland 12, the rings being arranged to bear upon a piston-rod 13 encircled by them. The sealing-tongues 8 extend inwards from the shell of the gland towards the piston-rod as also do the narrow annular channels 7.

In Figure 4, seeing that the fluid-pressure approaches the rings first from one side of the piston and then from the other, the rings 2 in the upper end of the piston 1 have the tongues 8 arranged at the upper sides of the rings, and the rings 2 in the lower end of the piston have the tongues 8 arranged to bear on the lower sides of the rings.

I claim:

A packing device comprising the combination of a machine element having a groove therein, a packing-piece projecting from the groove, and an elastic sealing-tongue secured to the machine element, the sealing-tongue being exposed on its exterior face to the working fluid, being formed with a cross section tapering toward the free end thereof and being adapted to be pressed by said fluid against the packing-piece to effect the sealing thereof with respect to the machine element.

In testimony whereof I affix my signature.

KARL OTTO KELLER.